(12) United States Patent
Snir et al.

(10) Patent No.: US 10,474,481 B2
(45) Date of Patent: Nov. 12, 2019

(54) USER INTERFACE LAYOUT COMPARISON

(71) Applicant: ENT. SERVICES DEVELOPMENT CORPORATION LP, Houston, TX (US)

(72) Inventors: Ran Snir, Yehud (IL); Pablo Retyk, Yehud (IL); Lior Reuven, Yehud (IL); Arik Levin, Yehud (IL)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 0 days.

(21) Appl. No.: 15/306,712

(22) PCT Filed: Sep. 17, 2014

(86) PCT No.: PCT/US2014/056052
§ 371 (c)(1),
(2) Date: Oct. 25, 2016

(87) PCT Pub. No.: WO2016/043729
PCT Pub. Date: Mar. 24, 2016

(65) Prior Publication Data
US 2017/0192797 A1 Jul. 6, 2017

(51) Int. Cl.
*G06F 9/451* (2018.01)
*G06F 9/44* (2018.01)
*G06F 8/38* (2018.01)
*G06F 3/0484* (2013.01)
*G06F 11/36* (2006.01)
(Continued)

(52) U.S. Cl.
CPC .......... *G06F 9/451* (2018.02); *G06F 3/04845* (2013.01); *G06F 8/38* (2013.01); *G06F 9/44* (2013.01); *G06F 11/3684* (2013.01); *G06F 17/212* (2013.01); *G06F 3/0481* (2013.01);
(Continued)

(58) Field of Classification Search
CPC .. G06F 3/0482; G06F 3/04883; G06F 3/0488; G06F 3/04842; G06F 17/214
See application file for complete search history.

(56) References Cited

U.S. PATENT DOCUMENTS 8,458,614 B1   6/2013   Smith
8,566,744 B2  10/2013   Green
(Continued)

FOREIGN PATENT DOCUMENTS

WO    WO-2010107624    9/2010

OTHER PUBLICATIONS

Kok, Daniel, "Application Layout Testing for Android Mobile Devices" Master Thesis, Jul. 28, 2013, 82 pages. http://www.cs.rug.nl/~alext/PAPERS/MSc/kok13.pdf.
(Continued)

*Primary Examiner* — Quoc A Tran
(74) *Attorney, Agent, or Firm* — Sheppard Mullin Richter & Hampton LLP

(57) ABSTRACT

In an example implementation, a converted layout design of a user interface of an application may be generated from a layout design of the user interface and a layout design configuration. The converted layout design may correspond to a form factor. A screenshot of the user interface of the application may be captured on a device with the display resolution. In addition, the converted layout design may be compared with the screenshot.

14 Claims, 5 Drawing Sheets

(51) Int. Cl.
*G06F 17/21* (2006.01)
*G06F 3/0481* (2013.01)
*G06F 17/22* (2006.01)
*G06F 17/00* (2019.01)

(52) U.S. Cl.
CPC ........ *G06F 3/0484* (2013.01); *G06F 17/2247* (2013.01)

(56) References Cited

U.S. PATENT DOCUMENTS

| | | |
|---|---|---|
| 2005/0177772 A1 | 8/2005 | Derks et al. |
| 2009/0144652 A1 | 6/2009 | Wiley |
| 2011/0025706 A1 | 2/2011 | Etelper |
| 2014/0013234 A1* | 1/2014 | Beveridge ............. G06F 3/0484 715/740 |
| 2014/0075344 A1 | 3/2014 | Bentrup |
| 2014/0137246 A1 | 5/2014 | Baluda et al. |
| 2014/0156783 A1 | 6/2014 | Matthews et al. |
| 2014/0358919 A1* | 12/2014 | Chandra ............... G06F 16/285 707/737 |
| 2015/0052503 A1* | 2/2015 | Ligman ............... G06F 11/3664 717/125 |
| 2016/0249106 A1* | 8/2016 | Lachwani ...... H04N 21/234309 |

OTHER PUBLICATIONS

PCT; "Notification of Transmittal of the International Search Report and the Written Opinion of the International Searching Authority, or the Declaration"; cited in PCT/US2014/056052; dated May 27, 2015; 12 pages.

* cited by examiner

USER INTERFACE LAYOUT COMPARISON

CLAIM FOR PRIORITY

The present application is a national stage filing under 35 U.S.C. § 371 of PCT application number PCT/US2014/056052, having an international filing date of Sep. 17, 2014, the disclosure of which is hereby incorporated by reference in its entirety.

BACKGROUND

An application development lifecycle can include embedding the application design including user interface designs. Devices come in a variety of form factors. An application may be utilized by a variety of devices with any of the variety of form factors.

DETAILED DESCRIPTION

Figure 1:
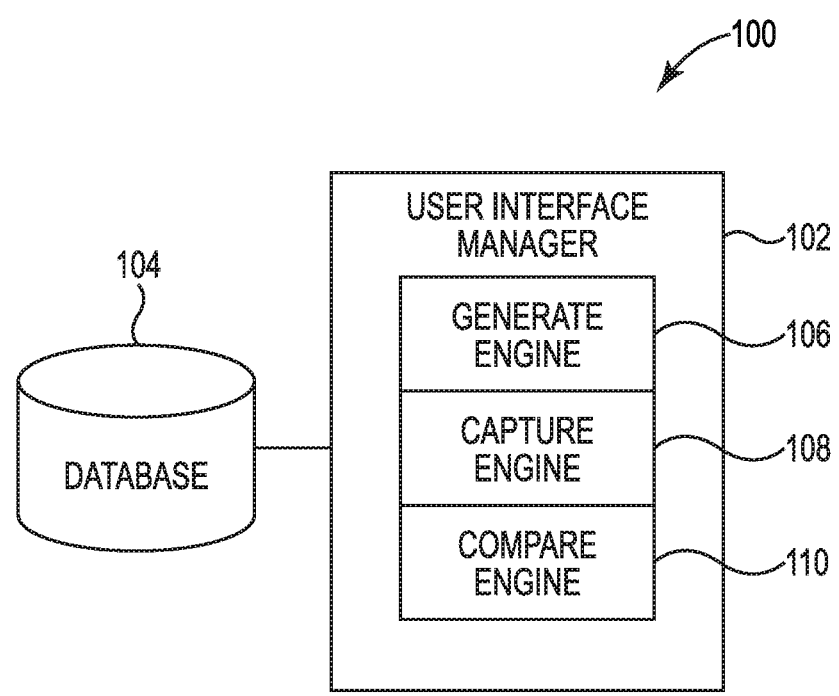
FIG. 1 illustrates a diagram of an example of a system for application user interface layout comparison according to the present disclosure.

Developing an application (e.g., a software application) can involve developing a user interface through which a user device can experience and/or interact with the application. This can include designing layouts for the user interface. While an application layout instance of the user interface may display correctly on a particular device with a particular form factor, it may be prone to defects and accompanying functional problems on another device with another form factor. Maintaining a consistent user interface appearance and functionality across a variety of devices can be an element of conformity and reliability of an application. Conformity and reliability can contribute to the success and adoption of an application.

The variety of devices present in the marketplace can include a variety of device form factors (e.g., shape, processor, operating system, display size, display resolution, input mechanism, etc.) that complicate achieving this consistent appearance, for example, by processing and displaying the user interface in a variety of ways. Developing an application with consistent display and functioning across a variety of devices with a variety of form factors can include testing the application's user interface design across the devices and/or form factors.

Testing the application's user interface design may be performed via manual comparison using the human eye. In such a comparison the human eye/brain may manually analyze a user interface layout on a device with a particular form factor and attempt to detect any defects. However, the human eye/brain may lack the capacity to precisely discriminate defects in a user interface layout appearance and/or functioning.

Some user interface automation tools may test the application's user interface design through functional testing such as testing if a calculation is correct across multiple devices for a calculating application. However, functional testing performed on multiple devices may result in a successful run even when defects in a user interface layout exist. Accordingly, these tools may result in false negatives thereby unknowingly compromising the conformity and/or relatability of the application.

In contrast, embodiments of the present disclosure describe a system, method, and computer readable medium for user interface layout comparison across devices and/or form factors. For example, user interface layout comparison can include generating, from a layout design of a user interface of an application and a layout design configuration, a converted layout design of the user interface, where the converted layout design corresponds to a form factor; capturing a screenshot of the user interface on a device with the form factor; and comparing the converted layout design with the screen shot.

In an example, user interface layout comparison according to the present disclosure can include a user interface similarity service (e.g., an application) to test applications for defects in the appearance and/or function of a user interface of the application across devices and/or form factors. The service can include an on-demand testing tool and/or environment to process inputs to generate outputs including results of user interface comparisons. The service can be provided utilizing a cloud infrastructure and/or virtual machines. The inputs to the service can include a number of files and/or information provided by an application developer. The inputs can include the application itself, a run instruction associated with the application, a layout design for each of a number of user interfaces and/or breakpoints of the application, and a layout design configuration for each of the number of user interfaces and/or breakpoints of the application.

Figure 2:
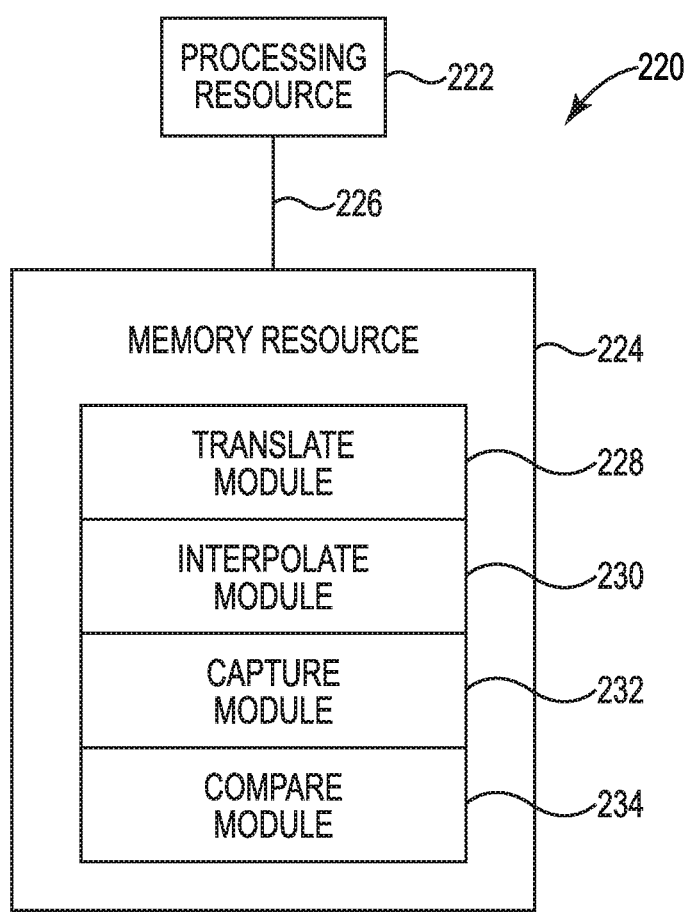
FIG. 2 illustrates a diagram of an example of a computing device according to the present disclosure.

FIGS. 1 and 2 illustrate examples of system 100 and computing device 220, respectively, according to the present disclosure. FIG. 1 illustrates a diagram of an example of a system 100 for user interface layout comparison according to the present disclosure. The system can include a database 104, a user interface manager 102, and/or a number of engines (e.g., generate engine 106, capture engine 108, compare engine 110). The user interface manager 102 can be in communication with the database 104 via a communication link, and can include the number of engines (e.g., generate engine 106, capture engine 108, compare engine 110). The user interface manager 102 can include additional or fewer engines than are illustrated to perform the various functions as will be described in further detail.

The number of engines (e.g., generate engine 106, capture engine 108, compare engine 110) can include a combination of hardware and programming, but at least hardware, that is to perform functions described herein (e.g., generate, from a layout design of a user interface of an application and a layout design configuration, a converted layout design of the user interface, where the converted layout design corresponds to a form factor, etc.). The programming can include program instructions (e.g., software, firmware, etc.) stored in a memory resource (e.g., computer readable medium, machine readable medium, etc.) as well as hard-wired programs (e.g., logic).

The generate engine 106 can include hardware and/or a combination of hardware and programming, but at least hardware, to generate a converted layout design of a user interface of an application. As used herein, a converted layout design includes a graphical representation of a targeted layout design appearance. A targeted layout design appearance can include a layout design appearance that reflects a defect-free appearance of the user interface on a device display having a particular form factor.

The converted layout design can be generated from an input. For example, the converted layout design can be generated from a layout design of the user interface of the application. As used herein, a layout design of the user interface of the application includes an image and/or other specification of the appearance of a user interface on a display. That is, the layout design can include a plan for how the particular user interface at a particular breakpoint will appear on a display according to an embedded design in the application. The converted layout design can be a conversion of the layout design of the user interface of the application to a particular form factor associated with a device.

The converted layout design can be generated from the layout design and a layout design configuration. As used herein a layout design configuration includes parameters (e.g., dimensions of elements, height, width, style specifications, element labels, element colors, element shapes, element text, etc.) associated with the layout design. The layout design configuration can be a file guideline and/or a style guide applicable to the layout design. The layout design configuration can define how the layout design will be graphically represented on a device display. That is, the layout design configuration can include instructions applied to the layout design that instruct how to graphically display the layout design on a display of a device with a particular form factor. The layout design configuration can include, for example, a width associated with a layout design, a height associated with a layout design, a layout type (e.g., header layout, footer layout, etc.) associated with a layout design.

The converted layout design can be a design that is targeted by the user interface similarity service. The user interface similarity service can test an application user interface across a plurality of devices with a plurality of form factors. With regard to a particular device and/or form factor the user interface similarity service can target that device and/or form factor for testing. That is, the targeted device and/or form factor can be the device and/or form factor upon which the appearance of the user interface is tested. Accordingly, the converted layout design can be a targeted layout design in that the converted layout design is a layout design interpolated to the targeted form factor. For example, if the user interface similarity service is testing the user interface appearance on a mobile device with a 640 pixel×960 pixel display resolution form factor (e.g., the targeted form factor in this case) the converted layout design can target a 640 pixel×960 pixel display resolution in converting the layout design.

The converted layout design can be generated by calculating a targeted layout design based on the layout design, the layout design configuration, and the targeted form factor of device. That is, the converted layout design can translate a user interface design layout to a converted layout design based on the layout design configuration and a determination of a targeted form factor. Therefore, the converted layout design can correspond to the particular form factor targeted in the conversion of the layout design.

The capture engine 108 can include hardware and/or a combination of hardware and programming, but at least hardware, to capture a screenshot of the user interface as it is displayed on a device. As used herein a screenshot includes an image captured from a device display and/or a simulated device display. The screenshot can be captured from a device having the particular form factor targeted in calculating the converted layout design from the layout design and layout design configuration. The screenshot can be a captured image of the graphical representation of a user interface as it appears on the device. The screenshot can correspond to the converted layout design. That is, both the converted layout design and the screenshot will include a graphical representation of the same user interface at the same breakpoint of the application being tested; the screenshot representing how the user interface actually appeared on the device display and the converted layout design representing how the user interface was targeted to appear on the device display. If, during testing, the device does not induce any defects in the user interface appearance the screen shot can be identical to (e.g., appear visually the same to a user and/or an observer) the converted layout design.

The compare engine 110 can include hardware and/or a combination of hardware and programming, but at least hardware, to compare the converted layout design with the screenshot. Comparing the converted layout design with the screenshot can include detecting defects in the screenshot by detecting similarity and/or differences between the appearance of the user interface captured in the screenshot and the corresponding converted layout design.

FIG. 2 illustrates a diagram of an example of a computing device 220 according to the present disclosure. The computing device 220 can utilize software, hardware, firmware, and/or logic to perform functions described herein.

The computing device 220 can be any combination of hardware and program instructions to share information. The hardware, for example, can include a processing resource 222 and/or a memory resource 224 (e.g., non-transitory computer-readable medium (CRM), machine readable medium (MRM), database, etc.). A processing resource 222, as used herein, can include any number of processors capable of executing instructions stored by a memory resource 224. Processing resource 222 can be implemented in a single device or distributed across multiple devices. The program instructions (e.g., computer readable instructions (CRI)) can include instructions stored on the memory resource 224 and executable by the processing resource 222 to implement a desired function (e.g., translate a layout design of a user interface of an application to a plurality of user interface elements based on a layout design configuration; interpolate each of the plurality of user interface elements to a converted layout design of the user interface corresponding to a form factor; capture a screenshot of the application on a device with the form factor; compare the converted layout design with the screenshot; etc.).

The memory resource 224 can be in communication with the processing resource 222 via a communication link (e.g., a path) 226. The communication link 226 can be local or remote to a machine (e.g., a computing device) associated with the processing resource 222. Examples of a local communication link 226 can include an electronic bus internal to a machine (e.g., a computing device) where the memory resource 224 is one of volatile, non-volatile, fixed, and/or removable storage medium in communication with the processing resource 222 via the electronic bus.

A number of modules (e.g., translate module 228; interpolate module 230; capture module 232; compare module 234) can include CRI that when executed by the processing resource 222 can perform functions. The number of modules (e.g., translate module 228; interpolate module 230; capture module 232; compare module 234) can be sub-modules of other modules. For example, the translate module 228; interpolate module 230 can be sub-modules and/or contained within the same computing device. In another example, the number of modules (e.g., translate module 228; interpolate module 230; capture module 232; compare module 234) can comprise individual modules at separate and distinct locations (e.g., CRM, etc.).

Each of the number of modules (e.g., translate module 228; interpolate module 230; capture module 232; compare module 234) can include instructions that when executed by the processing resource 222 can function as a corresponding engine as described herein. For example, the capture module 232 and compare module 234 can include instructions that when executed by the processing resource 222 can function as the capture engine 108 and the compare engine 110, respectively. In another example, the translate module 228 and interpolate module 230 can include instructions that when executed by the processing resource 222 can function as the generate engine 106.

The translate module 228 can include CRI that when executed by the processing resource 222 can translate a layout design of a user interface of an application to a plurality of user interface elements. The layout design can be translated to a plurality of user interface elements based on a layout design configuration. For example, the layout design configuration can include file guidelines for generating a graphical display of the layout design including parameters (e.g., dimensions of elements, height, width, style specifications, element labels, element colors, element shapes, element text, etc.) of portions (e.g., header, footer, inner, icon, input box, etc.) of the graphical display. These portions can be translated to user interface elements based on the parameters specified in the layout design configuration.

The interpolate module 230 can include CRI that when executed by the processing resource 222 can interpolate each of the plurality of user interface elements to a converted layout design of the user interface corresponding to a form factor. The interpolation of the user interface elements to a converted layout design can be based on the layout design configuration and the targeted form factor of a device for which the application user interface is being tested. For example, the user interface elements can be scaled to a targeted display resolution of a device based on the header and footer parameters fixed in the layout design configuration.

The capture module 232 can include CRI that when executed by the processing resource 222 can capture a screenshot of the application on a device with the form factor. For example, capturing the screenshot can include capturing an image of the appearance of the user interface on the display of a mobile device having the targeted display resolution.

The compare module 234 can include CRI that when executed by the processing resource 222 can compare the converted layout design with the screenshot. Comparing can include detecting similarity and/or differences between the screenshot and the corresponding converted layout design. For example, comparing the image of the screenshot with the image of the corresponding layout design can include quantifying and/or identifying where the images are identical and where they are different. Further, the compare module 234 can include CRI that when executed by the processing resource 222 can generate an image differential between the converted layout design and the screenshot. For example, this can include conducting a pixel by pixel comparison of the converted layout design and the screenshot and generating a difference mask showing the exact pixels that have changed from the converted layout design to the screenshot.

Figure 3:
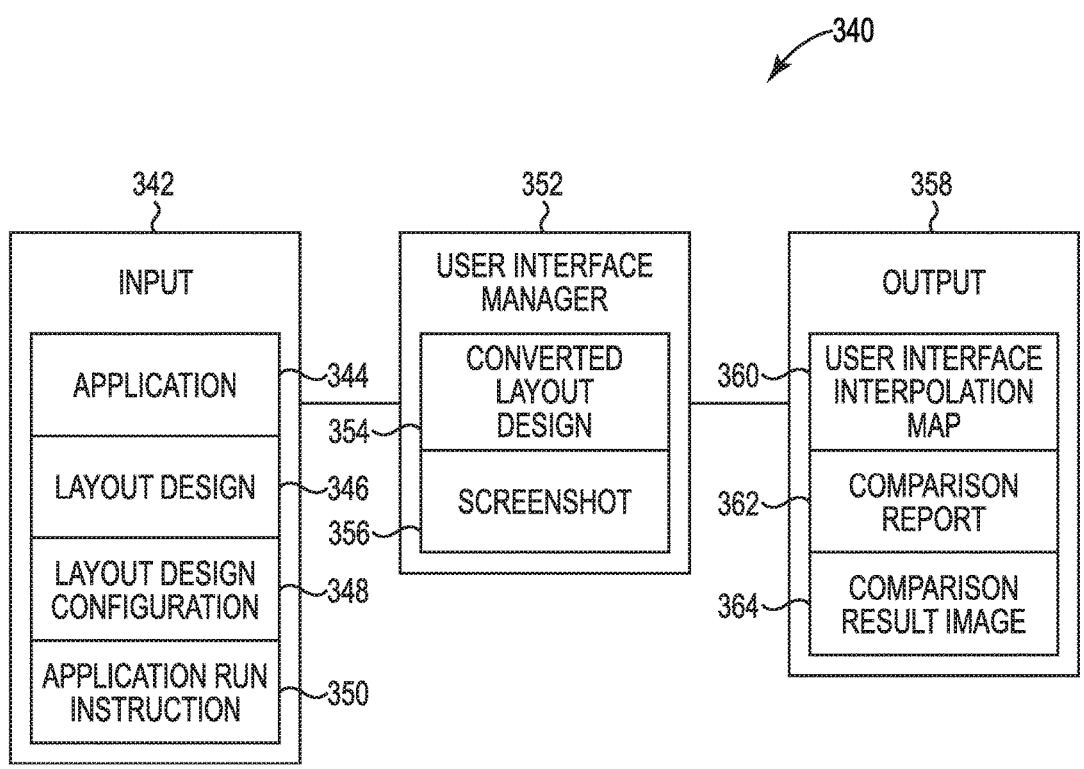
FIG. 3 illustrates an example of an environment suitable for application user interface layout comparison according to the present disclosure.

FIG. 3 illustrates an example of an environment 340 suitable for user interface layout comparison according to the present disclosure. The environment 340 is shown to include an input 342, an application 344, a layout design 346, a layout design configuration 348, an application run instruction 350, a user interface manager 352, a converted layout design 354, a screen shot 356, an output 358, a user interface interpolation 360, a comparison report 362, and a comparison result image 364.

The environment 340 can include an input 342. An input 342 can be an input received from a user device. The input 342 can include an application 344. The application 344 can be a software application undergoing development. The application 344 can be an application undergoing testing for user interface layout consistency across devices and/or form factors. The application 344 can have a number of user interfaces for testing on a variety of devices and/or device simulators having a number of form factors (e.g., shape, processor, operating system, display size, display resolution, input mechanism, etc.).

An input 342 can be a layout design 346. The layout design 346 can include a layout design for an aspect of the application 344. For example, the layout design 346 can be a graphical representation of the layout for a design of a user interface of the application 344 at a predetermined breakpoint in the operation of the application 344. The layout design 346 can be a specification of the appearance of a user interface embedded in the application 344. The layout design 346 can comprise an image and/or specifications defining an image appearance of a user interface on a device display. That is, the layout design 346 can be the plans for how a user interface of the application will appear on a device display.

An input 342 can be a layout design configuration 348. A layout design configuration 348 can include parameters (e.g., dimensions of elements, height, width, style specifications, element labels, element colors, element shapes, element text, etc.) associated with a corresponding layout design 346. The layout design configuration 348 can be a file guideline and/or a style guide applicable to the corresponding layout design 346. The layout design configuration 348 can define how the layout design 346 will be graphically represented on a device display. That is, the layout design configuration 348 can include instructions applied to the layout design 346 that instruct how to graphically display the layout design 346 on a display of a device with a particular form factor.

An input 342 can be an application run instruction 350. An application run instruction 350 can include an instruction for running and/or testing the application 344. For example, the run instruction 350 can include a script that when executed will run the application 344 through a series of tasks (e.g., a task flow). The run instruction 350 can include predetermined breakpoints for testing user interfaces of the application 344. As used herein, a breakpoint includes an intentional stopping or pausing place in an application put in place for acquiring knowledge about the application appearance and/or functioning during its execution. The breakpoint can be defined by the occurrence of one or more conditions that determine when the applications execution should be interrupted. During the interruption the application can be inspected and/or tested. For example, the run instruction 350 can specify when during the execution of an application 344 the testing (e.g., generating a converted layout design 354, capturing the screen shot 356, etc.) of the user interface layout design 346 should occur. That is, the application run instruction 350 can specify at what point the user interface should be captured by the screenshot 356 and what that screenshot 356 is targeted to look like at that point represented by a converted layout design 354 based on the layout design 346 and layout design configuration 348.

The application 344, layout design 346, layout design configuration 348, and/or application run instruction 350 can be received as a single input 342 or as multiple inputs. The input 342 and output 358 can be a portion of an application 344 development platform.

The environment 340 can also include a user interface manager 352. The user interface manager 352 can receive the input 342 and perform analysis and conversion of the input 342. The user interface manager 342 can generate an output 358 from the input 342. The user interface manager 342 can translate the layout design 346 of the user interface of the application 344 into a plurality of user interface elements. The user interface elements can include a layout element and/or a basic element. As used herein, a layout element is an element of a layout design 346 that can include portions of the layout design 346. For example, a layout element can include a header portion of the layout design 346, a footer portion of a layout design 346, and/or a center portion between the header and footer portions of the layout design 346. Each layout element can include a sub-layout. That is, each layout element can include a layout of basic elements. A basic element can include a portion of a layout element. For example, the basic elements can include a button, a text area, an image, etc. within a layout element.

Translating the layout design 346 into a plurality of user interface elements can include identifying the user interface elements based on a layout design configuration 348. The layout design configuration 348 can define the user interface elements via included parameters (e.g., dimensions of elements, height, width, style specifications, element labels, element colors, element shapes, element text, etc.). For example, the layout design configuration 348 can include a width, height, and layout type of a user interface element such as a header of a layout design 346.

The user interface manager 352 can interpolate each of the plurality of user interface elements translated from the layout design 346 to adjust each of the user interface elements so that they will scale appropriately to a new form factor. For example, each of the plurality of user interface elements translated from the layout design 346 can be interpolated so that the resulting user interface elements will appear as specified in the layout design 346 and/or the layout design configuration 348 after being scaled to a new display resolution. In an example, this can include stretching the user interface elements to fit the new display resolution that is larger than the display resolution characterized in the layout design 346 and/or the layout design configuration 348. The result of the translation of the layout design 346 to a plurality of user interface elements and the interpolation of those elements can be a converted layout design 354.

A converted layout design 354 can include a targeted layout design for a user interface of the application 344. That is, the converted layout design 354 can include a graphical representation and/or a specification of a targeted appearance of the user interface of the application 344 on a device with a particular form factor. For example, the converted layout design 354 can represent a target appearance of a user interface at a predetermined breakpoint (e.g., as specified in the application run instruction 350) on a device display that has a targeted display resolution. The converted layout design 354 can be an image and/or other specification of the appearance of the user interface as it will appear on the targeted device display (device display having the targeted form factor) if displayed in an error free manner. That is, if conversion of the layout design 346 by the actual device and/or a device simulator executing the application 344 occurs without producing any artifacts (e.g., errors, improper stretching of elements, incorrect location of elements, loss of proper scale of elements, etc.) then the actual display of that user interface will appear identical to the converted layout design 354.

In some examples, the user interface manager 352 can include a plurality of devices and/or device simulators (e.g., virtual device displays based on known form factors of the device). Each of the plurality of devices and/or device simulators can correspond to a particular device having a particular form factor. The form factor corresponding to a particular device of the plurality of devices can be used as the targeted form factor for the converted layout design 354 when that device is selected for use in the testing of the user interface.

The user interface manager 352 can include a catalog of devices and/or device simulators for popular mobile computing devices. Each of the catalog of devices and/or device simulators for use in testing of the user interface can be selected and the user interface manager 352 can test user interfaces on the selected devices and/or device simulators. The user interface manager 352 can cycle through the catalog of devices and/or device simulators while performing testing of the user interface to test the user interface on a range of devices with a range of form factors.

The user interface manager 352 can execute the application 344 on the device and/or device simulator according to the application run instruction 350. Executing the application 344 can include executing the instructions specified in the application run instruction 350 and capturing a screenshot 356 at a predetermined breakpoint. The application 344 can be executed by the user interface manager 352 such that its execution appears on a display of the device or a device display simulator. For example, the application 344 can be executed by the user interface manager 352 such that it appears on a device display simulator simulating a device display having a display resolution corresponding to a known device.

Capturing the screenshot 356 can include capturing an image of the visible items displayed on the device display or device display simulator. For example, the application 344 can be executed by the user interface manager 352 such that it displays the application 344 user interfaces on the device display or device display simulator and a screen shot 356 of the user interfaces can be captured from the device display or device display simulator at a predetermined breakpoint specified in the application run instruction 350.

The user interface manager 352 can compare the converted layout design 354 with the corresponding screenshot 356. The converted layout design 354 is targeted to a particular form factor and it corresponds to a screenshot 356 captured from a device and/or device simulator that has the same form factor. That is, the converted layout design 354 is targeted to a particular device and/or a particular property of a device and the screenshot 356 is captured from that particular device allowing a direct comparison between the two. In such examples, the converted layout design 354 is the targeted appearance of a user interface on a device and the screenshot 356 is the actual appearance of the user interface on the device.

Comparing the converted layout design 354 with the corresponding screenshot 356 can be accomplished through a pixel by pixel comparison of the converted layout design 354 with the corresponding screenshot 356. Comparing can include identifying where pixels of the converted layout design 354 do not align with a corresponding pixel of the screenshot 356. Comparing can include performing measurements of the converted layout design 354 and the screenshot 356 including measurements of the user interface elements of each and comparing these measurements.

The environment 340 can also include an output 358. The user interface manager 352 can generate an output 358. The output 358 can be displayed on and/or communicated to a user device. The output 358 can include the results of the comparison of the converted layout design 354 and the screenshot 356 and/or additional tools useful in interpreting the comparison. For example, the output 358 can include a user interface interpolation map 360. As used herein, a user interface interpolation map 360 includes a graphical representation of the interpolated plurality of user interface elements translated from the layout design 346. Rather than an image of the actual user interface as it is targeted to appear on the device display, the interface interpolation map 360 can include a skeletal image version of the interpolated user interface elements of the converted layout design 354 with each of the user interface elements being represented by a colored shape. The shape can correspond in dimension and scale to the user interface elements such that the shape occupies the same space as the corresponding user interface element. For example, if the user interface element is a selectable icon, the shape can occupy the same portion of the image within which the area that initiates selection of the selectable icon. The interface interpolation map 360 can be a used to graphically represent the converted layout design 354 in a format that allows for a visual conceptualization of the user interface element boundaries by the human eye and can provide a useful reference tool to help identify and understand the positioning of user interface elements.

The output 358 can include a comparison report 362. As used herein, a comparison report 362 includes a report characterizing the differences and/or similarities between the converted layout design 354 and the screenshot 356. The comparison report 362 can include descriptions (e.g., text, mathematical expressions, illustrations, etc.) of how the screenshot 356 differs from the converted layout design 354 and/or can suggest remedial design measures that can be incorporated into the application 344, layout design 346, and/or layout design configuration 348 to correct the differences. The comparison report 362 can include dimensions and/or measurements of the differences between the converted layout design 354 and the screenshot 356.

The output 358 can include a comparison result image 364. As used herein, a comparison result image 364 can include an indication of each pixel of the converted layout design 354 and each pixel of the screenshot 356 that differ. For example, the comparison result image 364 can include a graphical representation of pixels of user interface elements of the screenshot 356 that do not align with the corresponding user interface element pixels of the converted layout design 354. In an example, the pixels of the converted layout design 354 and the pixels of the screenshot 356 that differ can be indicated by appearing in color on a contrasting background. For example, the differing pixels can be printed to a black screen.

The output 358 can be used to modify the application 344, the layout design 346, and/or the layout design configuration to resolve any differences between the converted layout design 354 and the screenshot 356. In this manner, the user interface of the application 344 can be tested and modified so that is provides a consistent appearance and functioning across a variety of devices and/or form factors.

Figure 4:
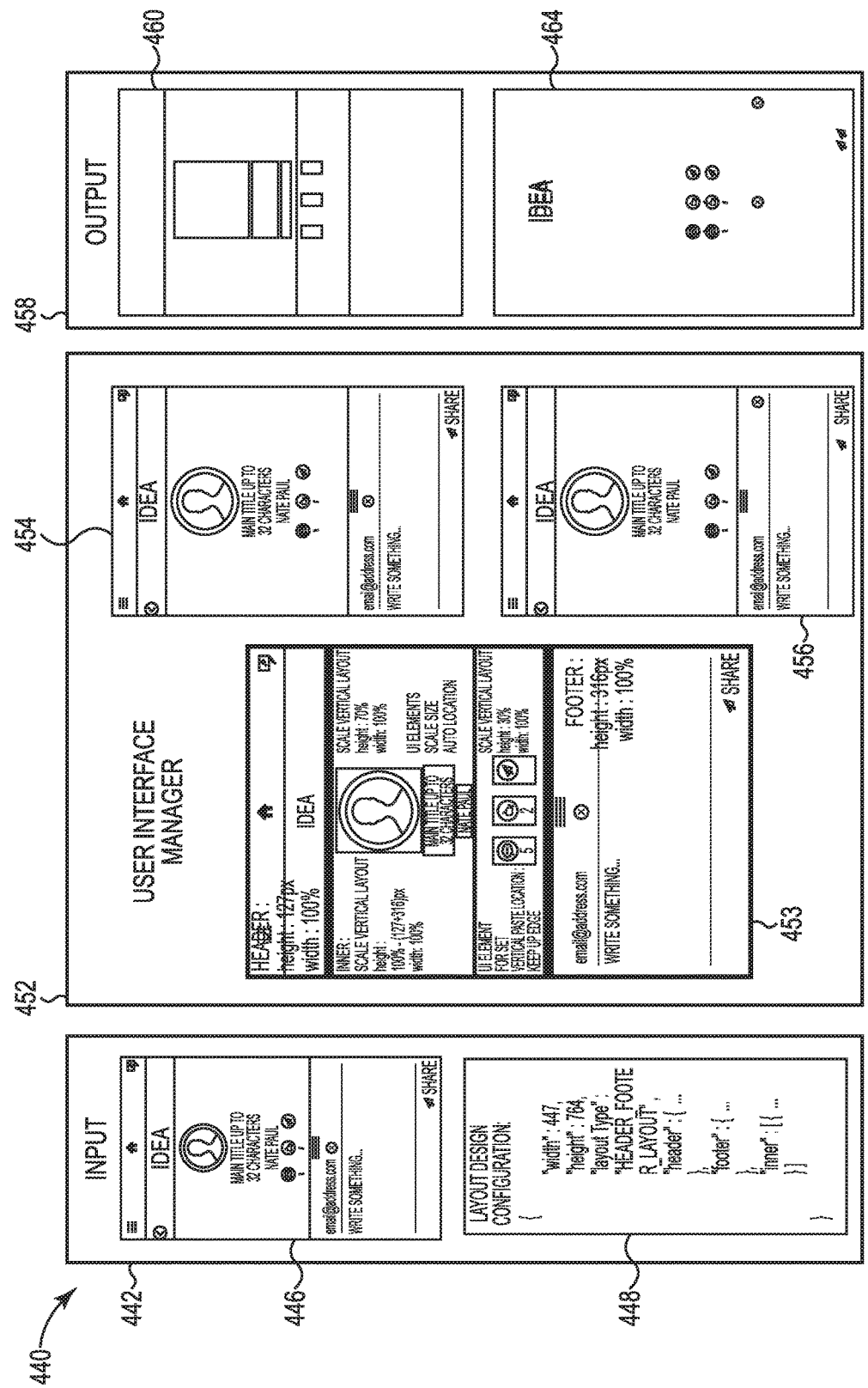
FIG. 4 illustrates an example of an environment suitable for application user interface layout comparison according to the present disclosure.

FIG. 4 illustrates an example of an environment 440 suitable for user interface layout comparison according to the present disclosure. The environment 440 is shown to include an input 442, a layout design 446, a layout design configuration 448, a user interface manager 452, a translated layout design 453, a converted layout design 454, a screen shot 456, an output 458, a user interface interpolation map 460, and a comparison result image 464.

The environment 440 can include as an input 442 a layout design 446 and/or a layout design configuration 448. The layout design 446 can be an image of a user interface of an application at a predetermined breakpoint in the operation of the application. The layout design 446 can be a specification of the appearance of the user interface of the application. That is, the layout design 446 can be a plan for how a user interface of the application will appear on a device display. As illustrated in FIG. 4, layout design 446 can be an image of a user interface including selectable icons, text blocks, and other design elements. As illustrated in FIG. 4, the layout design can be formatted for a 447 pixel×764 pixel display resolution.

The layout design configuration 448 can define the user interface elements of the layout design 446 via included parameters (e.g., dimensions of elements, height, width, style specifications, element labels, element colors, element shapes, element text, etc.). For example, the layout design configuration 448 can include a width, height, and layout type of a user interface element.

The user interface manager 452 can translate the layout design 446 to a translated layout design 453 of the user interface including a plurality of identified user interface elements (e.g., illustrated as highlighted by boxes in translated layout design 453) based on the layout design configuration 448. Each of the plurality of user interface elements of the translated layout design 446 can be interpolated to a converted layout design 454 of the user interface corresponding to a display resolution. The converted layout 454 can include an image of the targeted layout appearance for a user interface of the application on a device having the targeted form factor. For example, the converted layout design 454 can include a targeted layout appearance of the user interface for display on a device display with a 640 pixel×960 pixel display resolution.

The user interface manager 452 can capture the screenshot 456 from the targeted device display and/or targeted device display simulator. For example, the user interface manager 452 can capture the screenshot 456 from a targeted mobile device having a 640 pixel×960 pixel display resolution. The user interface manager 452 can compare the converted layout design 454 with the screenshot 456. For example, the user interface manager 452 can conduct a pixel by pixel comparison between the converted layout design 454 and the screenshot 456.

The user interface manager 452 can generate an output 458 based on this comparison. The output 458 can include a user interface interpolation map 460. The user interface interpolation map 460 can include a skeletal image version of the user interface elements identified in the translated layout design 453 with each of the user interface elements being represented by a colored shape. The shape can correspond in dimension and scale to the user interface elements such that the shape occupies the same space as the corresponding user interface element. The interface interpolation map 460 can be a used to graphically represent the converted layout design 454 in a format that allows for an identification of the user interface element boundaries by the human eye and can provide a useful reference tool to help identify and understand the positioning of user interface elements.

The output 458 can also include a comparison result image 464. The comparison result image 464 can include an image of pixels from the screenshot 456 that do not align with their corresponding pixels in the converted layout design 454 printed onto a black background. The comparison result image 464 can provide an uncluttered view of the non-aligning pixels indicating an error and/or formatting anomalies creating an appearance inconsistency between how the design was intended to look on a particular device display (e.g., the converted layout design 454) and how it actually appears on the particular device display (e.g., screenshot 456). The comparison result image 464 can be used in combination with the user interface interpolation map 460 to identify the anomalous user interface elements and/or suggest corrections to the application to compensate for the anomalies.

Figure 5:
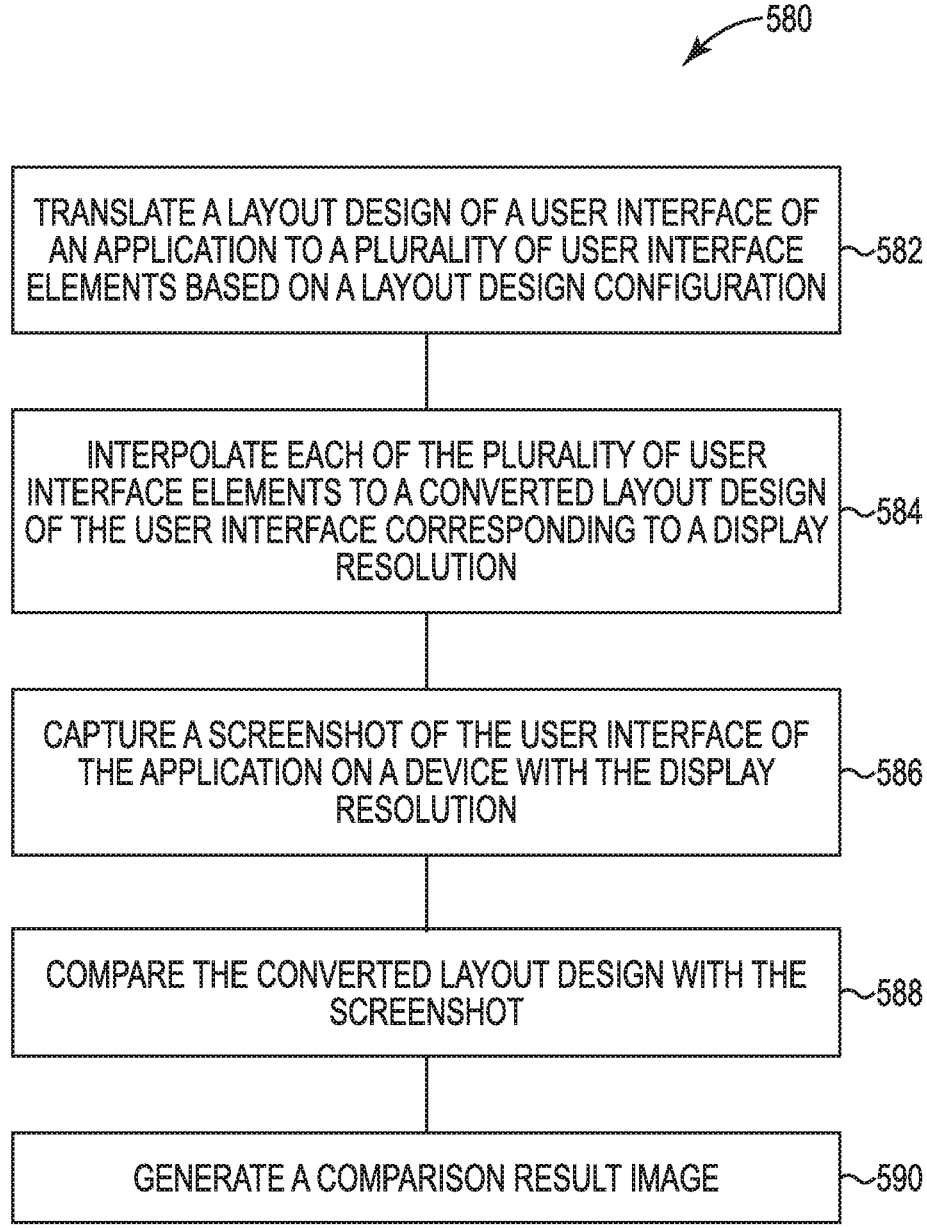
FIG. 5 illustrates a flow chart of an example of a method for application user interface layout comparison according to the present disclosure.

FIG. 5 illustrates a flow chart of an example of a method 580 for user interface layout comparison according to the present disclosure. The method 580 can translate a layout design of a user interface to a plurality of user interface elements based on a layout design configuration, interpolate each of the plurality of user interface elements to a converted layout design, capture a screenshot of the application on a device, compare the converted layout design with the screenshot, and generate a comparison result image. In some examples, the method 580 can be performed utilizing a system (e.g., system 100 as referenced in FIG. 1) and/or a computing device (e.g., computing device 220 as referenced in FIG. 2).

At box 582 the method 580 can include translating a layout design of a user interface of an application to a plurality of user interface elements. The translation can be based on a layout design configuration. The plurality of user interface elements can be layout elements (e.g., an element containing another element, a header portion of a user interface, a center portion of a user interface, a footer portion of a user interface, etc.) and/or basic elements (e.g., selectable icons, buttons, text areas, images, etc.).

At box 584 the method 580 can include interpolating each of the plurality of user interface elements to a converted layout design of the user interface corresponding to a form factor. The form factor can be a display resolution of the device that is being targeted by the testing. That is, the display resolution can be an identical resolution to a display of a device on which the appearance of the application user interface is being tested.

At box 586 the method 580 can include capturing a screenshot of the application on a device with the form factor. Capturing the screenshot of the application on the device can include capturing an image of the application user interface from the display of the device and/or a device display simulator.

At box 588 the method 580 can include comparing the converted layout design with the screenshot. Comparing the converted layout design with the screenshot can include comparing each pixel of the converted layout design with each corresponding pixel of the screenshot. A corresponding pixel can include a pixel that is in the same physical pixel location on the display.

At box 590 the method 580 can include generating a comparison result image. The comparison result image can include an indication of each pixel of the converted layout design and each pixel of the screenshot that differ. For example, the comparison result image can include the differing pixels printed on a contrasting background. The method can also include generating a map of the interpolation of each of the plurality of user interface elements. A map of the interpolation can include a series of shapes corresponding to each of the plurality of user interface elements, where each shape illustrates a distortion of the corresponding user interface element associated with the display resolution. For example, the map of the interpolation can include shapes that occupy the same space on the display that the user interface elements occupy after interpolation so that they show a skeletal version of the appearance of the user interface elements after they have been modified to fit the targeted display resolution.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The figures herein follow a numbering convention in which the first digit or digits correspond to the drawing figure number and the remaining digits identify an element or component in the drawing. Similar elements or components between different figures may be identified by the use of similar digits. For example, 354 may reference element "54" in FIG. 3, and a similar element may be referenced as 454 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
   a generate engine to generate, from a layout design of a user interface of an application and a layout design configuration, a converted layout design of the user interface, wherein the converted layout design corresponds to a form factor having a display resolution;
   a capture engine to capture a screenshot of the user interface of the application on a device with the form factor, wherein the screenshot is captured during a predetermined breakpoint of the application; and
   a compare engine to compare pixels of the converted layout design with corresponding pixels of the screenshot, and to generate an image differential between the converted layout design and the screenshot.

2. The system of claim 1, wherein the screenshot of the user interface of the application is captured from a simulator of the device.

3. The system of claim 1, wherein a run instruction defines the predetermined breakpoint and a task flow to test the application.

4. The system of claim 1, wherein the converted layout design is a targeted user interface appearance for the form factor interpolated from the layout design.

5. A non-transitory computer readable medium storing instructions executable by a processing resource to cause a computer to:
   translate a layout design of a user interface of an application to a plurality of user interface elements based on a layout design configuration;
   interpolate each of the plurality of user interface elements to a converted layout design of the user interface, the converted layout design corresponding to a display resolution;
   capture a screenshot of the user interface of the application on a device with the display resolution, wherein the screenshot is captured during a predetermined breakpoint of the application; and
   compare pixels of the converted layout design with corresponding pixels of the screenshot and generate an image differential between the converted layout design and the screenshot.

6. The non-transitory computer readable medium of claim 5, further comprising instructions to output a comparison report characterizing the results of the comparison.

7. The non-transitory computer readable medium of claim 5, wherein the plurality of user interface elements includes layout elements.

8. The non-transitory computer readable medium of claim 5, wherein the plurality of user interface elements includes basic elements.

9. The non-transitory computer readable medium of claim 5, wherein the instructions to compare the converted layout design with the screenshot include instructions to calculate the image differential between the converted layout design and the screenshot.

10. A method comprising:
    translating a layout design of a user interface of an application to a plurality of user interface elements based on a layout design configuration;
    interpolating each of the plurality of user interface elements to a converted layout design of the user interface corresponding to a display resolution;
    capturing a screenshot of the user interface of the application on a device with the display resolution, wherein the screenshot is captured during a predetermined breakpoint of the application;
    comparing pixels of the converted layout design with corresponding pixels of the screenshot; and
    generating a comparison result image, wherein the generating comprises:
       generating an image differential between the converted layout design and the screenshot.

11. The method of claim 10, further comprising generating a map of the interpolation of each of the plurality of user interface elements.

12. The method of claim 11, wherein the map of the interpolation comprises a series of shapes corresponding to each of the plurality of user interface elements, wherein each shape illustrates an interpolation of the corresponding user interface element to the display resolution.

13. The method of claim 10, wherein comparing the converted layout design with the screenshot comprises comparing each pixel of the converted layout design with each corresponding pixel of the screenshot.

14. The method of claim 10, wherein the comparison result image includes an indication of each pixel of the converted layout design and each pixel of the screenshot that differ.

* * * * *